J. E. MYERS.
CUSPIDOR LIFTER.
APPLICATION FILED MAR. 19, 1910.

980,821.

Patented Jan. 3, 1911.

Witnesses

Inventor
Jacob E. Myers.
By C. A. Snow & Co.
Attorneys

UNITED STATES PATENT OFFICE.

JACOB E. MYERS, OF BLUE LAKE, CALIFORNIA.

CUSPIDOR-LIFTER.

980,821.  Specification of Letters Patent.  Patented Jan. 3, 1911.

Application filed March 19, 1910. Serial No. 550,312.

*To all whom it may concern:*

Be it known that I, JACOB E. MYERS, a citizen of the United States, residing at Blue Lake, in the county of Humboldt and State of California, have invented a new and useful Cuspidor-Lifter, of which the following is a specification.

It is the object of this invention to provide a device adapted for the manipulation and lifting of cuspidors, and other noisome vessels.

The objects of the invention are, to provide a device of the class above mentioned, adapted to house several cuspidors at once, to hold the cuspidors securely against dropping downwardly out of the device, and to secure the cuspidors against tilting laterally while they are being selected and carried.

The drawings show but one form of the invention, and it is to be understood that changes, properly falling within the scope of what is claimed, may be made, without departing from the spirit of the invention.

Similar numerals of reference are employed to denote corresponding parts throughout the several figures of the drawings.

Figure 1:
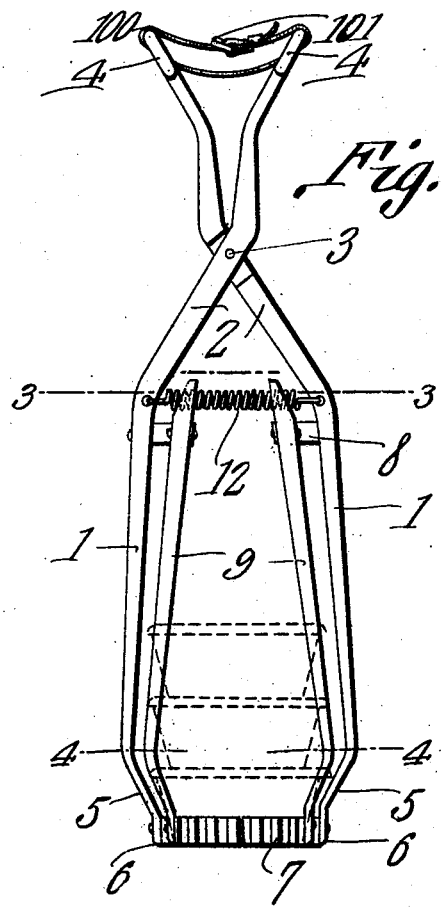
Figure 2:
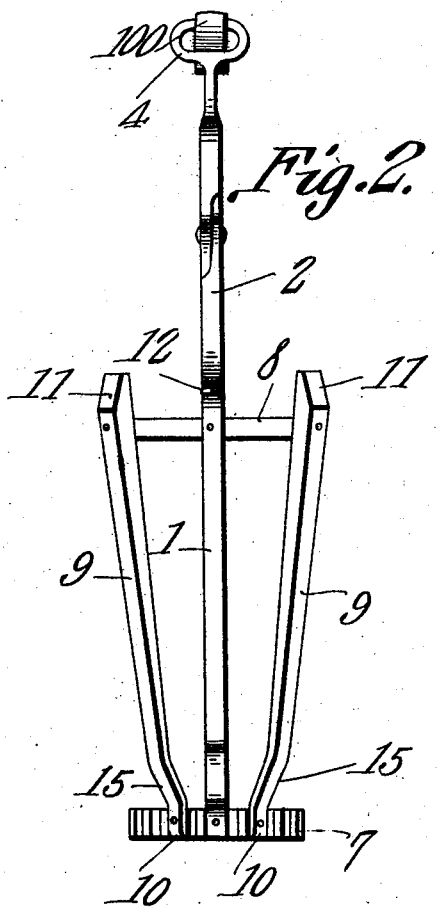
Figure 3:
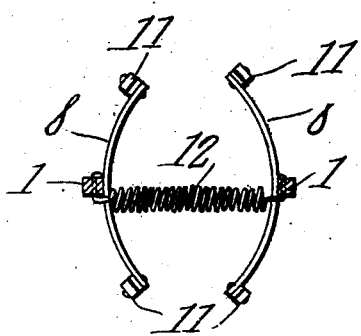
Figure 4:
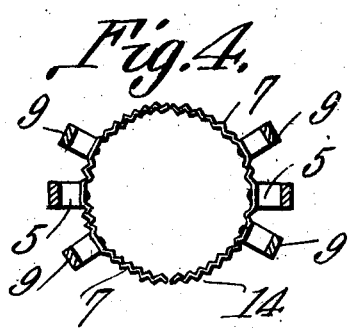

In the accompanying drawings,—Figure 1 is a side elevation of the device, showing several vessels retained thereby; Fig. 2 is a side elevation, the device being viewed at right angles to the showing of Fig. 1; Fig. 3 is a transverse section upon the line 3—3 of Fig. 1; and Fig. 4 is a transverse section upon the line 4—4 of Fig. 1.

In carrying out the invention, a pair of handles are provided, these handles consisting of upright portions 1, which, at their upper ends, converge as denoted by the numeral 2, and cross, the handles being secured together pivotally, at their point of crossing, by any suitable connecting device, denoted generally in the drawings, by the numeral 3. At their upper ends, the handles terminate in suitable grips 4. The lower ends of the portions 1 converge as denoted by the numeral 5, ultimately flexing into approximate parallelism, as shown at 6. Secured transversely of the handles, to the portions 6 thereof, are lower spring bands 7. These spring bands 7 are approximately semi-circular in form, so that their ends may be brought together to approximate the annular form shown in Fig. 4. As will be seen most clearly in Fig. 4, the lower spring bands 7 are transversely corrugated as denoted by the numeral 14, defining, upon the inner surfaces of the spring bands, a plurality of projections or teeth adapted to engage the vessel which is being lifted, to hold the vessel securely within the grip of the device, against slipping downwardly. Secured intermediate their ends to the portions 1 of the handles, and spaced considerably above the lower spring bands 7, are upper spring bands 8. These upper bands 8 are struck upon a considerably larger radius than are the lower springs bands 7. Bars 9 are provided, the lower ends of which converge as at 15, after the manner of the portions 5 of the handles. The lower ends of these bars 9 are secured to the lower spring plates 7, adjacent the portions 1 of the handles. The bars 9 diverge as they extend upwardly, and are united, adjacent their upper ends, with the upper spring plates 8, adjacent the ends of the said plates. Thus, although the upper ends 11 of the bars 9 are spaced widely apart, so as to inclose a relatively large area, the lower ends 10 of the bars 9 are disposed relatively near together, leaving the ends of the lower springs 7 free to yield when the cuspidor is introduced into the device, to embrace the cuspidor closely. Intermediate their ends, the handles are connected by a retractile spring 12, adapted to draw the lower ends of the handles together, to hold the lower spring bands 7 closely about the cuspidor. If desired, the grips 4, may be united by a strap 100, the ends of which are connected by means of a buckle 101. This strap 100 will serve as a useful adjunct in lifting the device and in carrying it about.

The operation of the device is as follows:—The grips 4 are seized, spreading the lower ends of the handles apart, thus permitting the lower spring bands 7 to be slipped about a vessel. When one of the grips 4 is released, the retractile spring 12 will draw the spring bands 7 closely about the vessel, the free ends of the bands 7 engaging the vessel closely, the corrugations 14 of the bands preventing the vessel from slipping downwardly from between the bands. A cuspidor thus engaged by the device, may be carried to, and superposed upon, another cuspidor, whereupon the device may be opened and made to engage the last named cuspidor, the process being repeated until the device has inclosed as many cuspidors as it will carry. It is to be noted that the bars 9 prevent the superposed cuspidors from tilting laterally out of the grip of the device, the bars 9 being actuated, moreover, by the upper spring bands 8, to engage and to grip the cuspidors, the springs 8 and the bars 9, thus coöperating with the lower springs 7 in holding the superposed cuspidors within the grip of the device.

Having thus described the invention, what is claimed is:—

1. A device of the class described comprising pivotally connected handles; upper and lower arcuate springs connected intermediate their ends with the handles; and diverging bars secured at their lower ends to the lower springs adjacent the handles, and at their upper ends secured to the upper springs adjacent the ends of said springs.

2. A device of the class described comprising pivotally connected handles; spaced, arcuate springs secured to each of the handles; rigid bars connecting the springs of each handle; and a spring terminally connected to the handles to force the bars normally toward each other.

In testimony that I claim the foregoing as my own, I have hereto affixed my signature in the presence of two witnesses.

JACOB E. MYERS.

Witnesses:
 FRANCIS W. ESLICK,
 JOHN A. MCPHERSON.